Dec. 26, 1933.    G. C. GUM    1,941,347
AUTOMATIC FRUIT GRIPPING AND CUTTING MECHANISM
Filed Nov. 27, 1931    5 Sheets-Sheet 1

Inventor
Guy C. Gum
By Mason, Fenwick & Lawrence
Attorney

Dec. 26, 1933.  G. C. GUM  1,941,347
AUTOMATIC FRUIT GRIPPING AND CUTTING MECHANISM
Filed Nov. 27, 1931  5 Sheets-Sheet 2
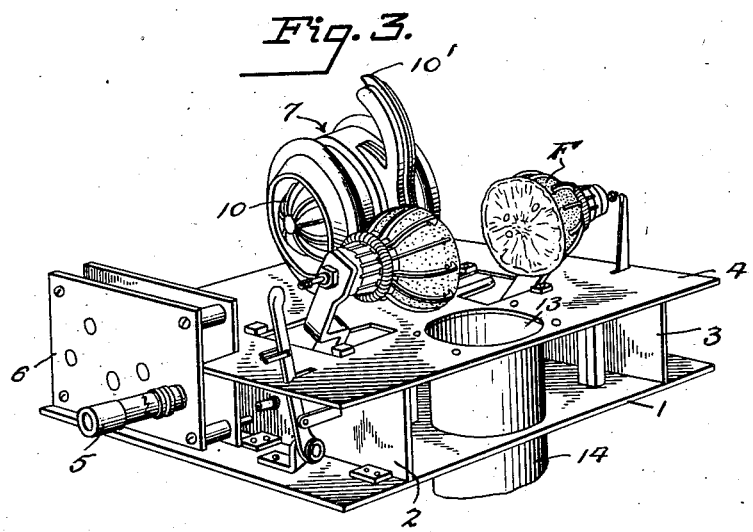
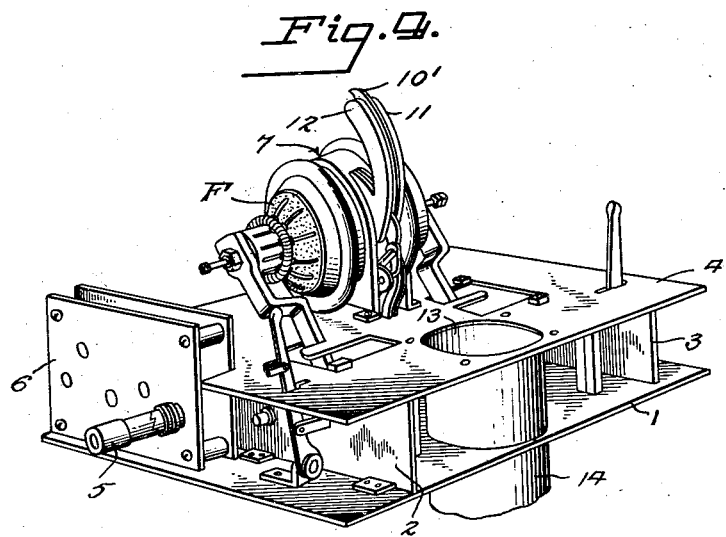
Inventor
Guy C. Gum
By Mason, Fenwick Lawrence
Attorney Dec. 26, 1933.　　　　G. C. GUM　　　　1,941,347
AUTOMATIC FRUIT GRIPPING AND CUTTING MECHANISM
Filed Nov. 27, 1931　　　5 Sheets-Sheet 3
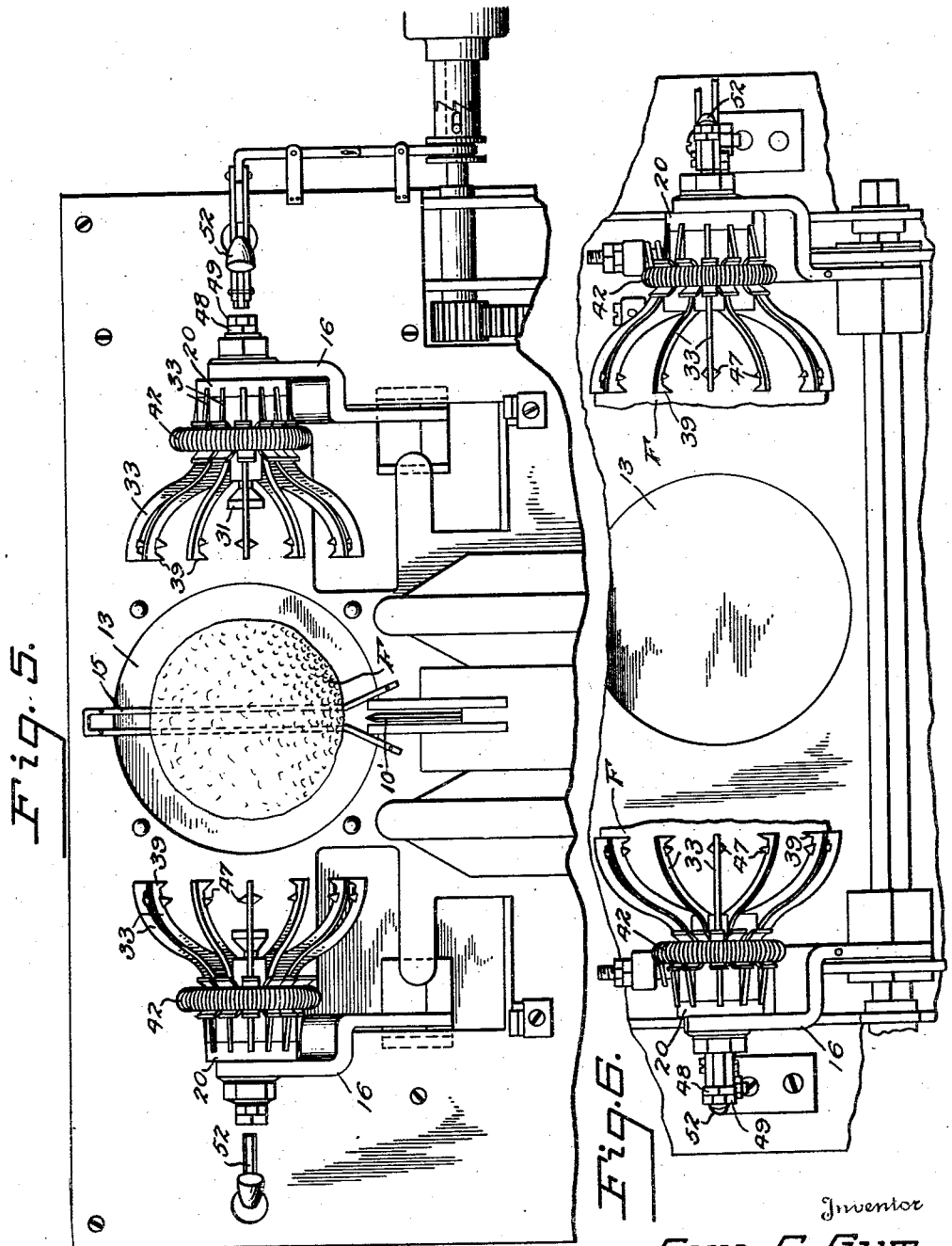
Inventor
Guy C. Gum
By Mason, Fenwick & Lawrence
Attorney Dec. 26, 1933.　　　　　G. C. GUM　　　　　1,941,347
AUTOMATIC FRUIT GRIPPING AND CUTTING MECHANISM
Filed Nov. 27, 1931　　　5 Sheets-Sheet 4
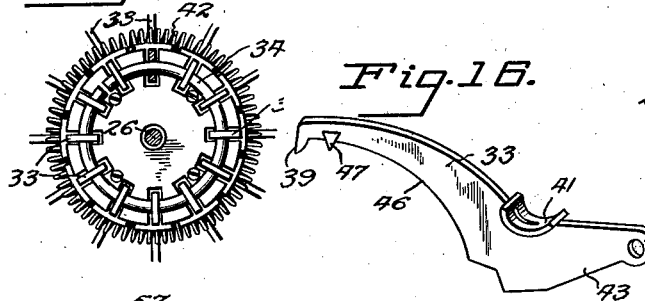
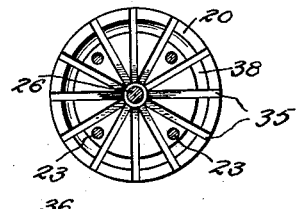
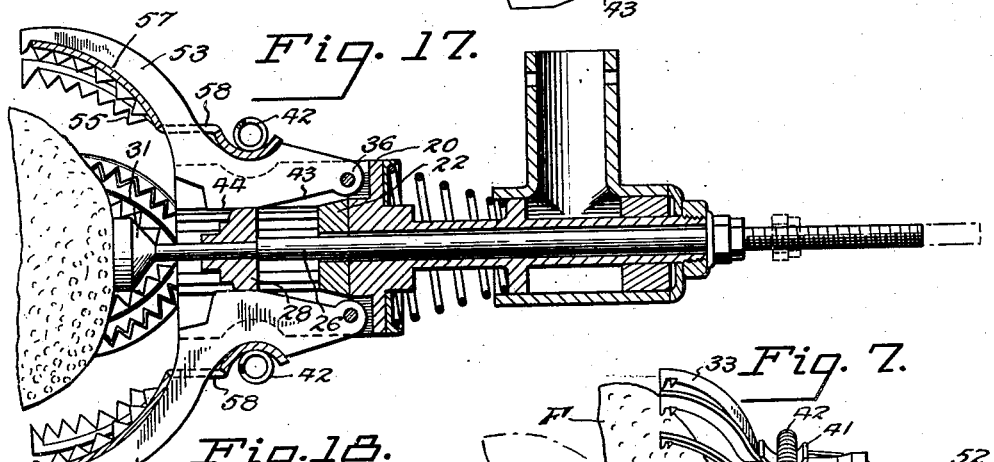
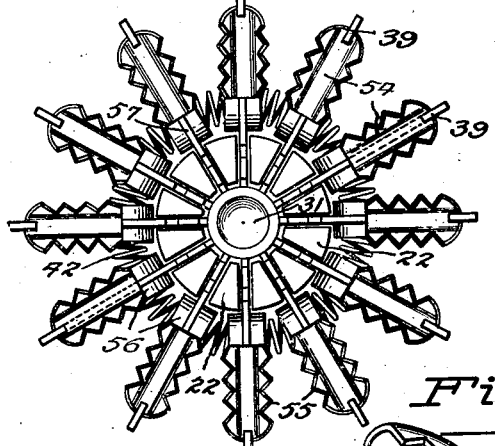
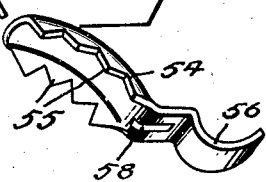
Inventor
Guy C. Gum
By Mason, Fenwick Lawrence
Attorney Dec. 26, 1933.  G. C. GUM  1,941,347
AUTOMATIC FRUIT GRIPPING AND CUTTING MECHANISM
Filed Nov. 27, 1931   5 Sheets-Sheet 5
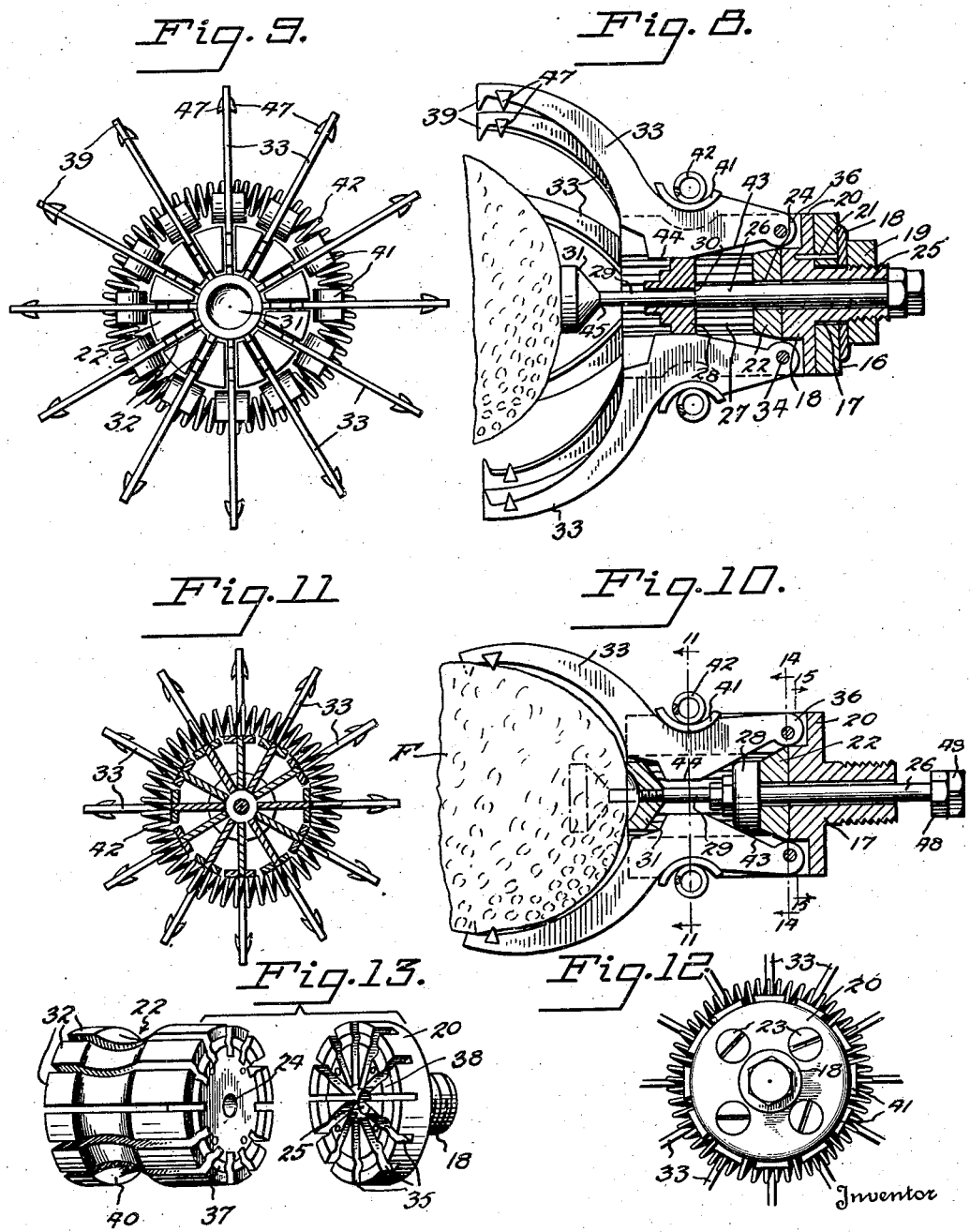

Patented Dec. 26, 1933

1,941,347

UNITED STATES PATENT OFFICE

1,941,347

AUTOMATIC FRUIT GRIPPING AND CUTTING MECHANISM

Guy C. Gum, Jacksonville, Fla., assignor, by mesne assignments, to Godfrey S. Rockefeller, Greenwich, Conn.

Application November 27, 1931
Serial No. 577,688

6 Claims. (Cl. 146—73)

This application is a continuation in part of my co-pending application, Serial No. 373,755, filed June 26, 1929, now matured into a Patent No. 1,834,097. The invention common to the two applications resides in mechanism for automatically gripping and holding whole fruit, such as an orange, lemon, etc., in a fixed position for severance, and then moving the severed parts to a milling device for removal of the juice.

The invention forming the subject matter of this application is an apparatus designed to be automatically operated, preferably by coin control, for the purpose of extracting the juice from oranges, grapefruit, lemons and similar fruits which are provided with a rind, skin or covering capable of being firmly held by a chuck.

The main object of the invention is to provide a machine for automatically extracting juice, pulp and seed, either one or both, or all, in one operation, from various fruits, vegetables or commodities; and particularly from citrus fruits.

Another object of the invention is to provide a machine to which whole fruits of the citrus variety may be fed to the machine automatically to be cut in two, and to have the juice automatically extracted from the two cut parts.

Other objects of the invention will become apparent as the detailed description thereof proceeds.

In the drawings:

Figure 3 is a perspective of the apparatus shown in Figure 2, but showing the gripping and cutting mechanisms in different position;

Figure 4 is a perspective of the machine with the parts moved from the position shown in Figure 4 and arranged in position for milling the juice from the previously cut halves of an orange held between co-operating gripping chucks forming part of this machine;

Figure 5 is a fragmentary plan to an enlarged scale of the fruit cutting and milling machine;

Figure 6 is a fragmentary plan of parts of the gripping and supporting mechanism shown in Figure 5 with several of the parts in different position;

Figure 7 is an end elevation of a fruit holding chuck forming part of this invention and showing it in operative connection with an extractor bar;

Figure 8 is a central vertical section through one of the chuck members for holding fruit properly positioned during the processing thereof by this machine;

Figure 9 is an end elevation of the parts shown in Figure 8;

Figure 10 is a view similar to Figure 8 but showing the several parts of the fruit gripping chuck contracted to hold a part of a fruit between the jaws thereof;

Figure 11 is a vertical transverse section taken on the line 11—11 of Figure 10;

Figure 12 is a rear end elevation of the parts shown in Figure 10;

Figure 13 is an exploded perspective of parts of the chuck mechanism shown in Figure 8;

Figure 14 is a vertical section taken on the line 14—14 of Figure 10;

Figure 15 is a vertical section taken on the line 15—15 of Figure 10;

Figure 16 is a perspective of one of the fruit gripping elements forming part of the said chuck mechanism;

Figure 17 is a central longitudinal section through a modified form of one of the fruit gripping mechanisms used as part of this apparatus;

Figure 18 is an end elevation of the mechanism shown in Figure 17; and

Figure 19 is a perspective view of a toothed element forming part of one of the gripper jaws of the mechanism illustrated in Figure 18.

The apparatus as a whole shown in Figures 1 to 4 inclusive, comprises a base plate 1 having standards 2 and 3 rising therefrom to support a table 4 on which the fruit gripping, severing and milling parts of the apparatus are operably supported. The various parts of the apparatus are operable by any suitable prime mover connected to a part 5 of suitable clutch mechanism extending laterally from a vertical face plate 6 of the machine.

The present invention is not concerned with the details of construction of the operating mechanism because these are fully disclosed and claimed in my copending application above referred to. The present invention is only concerned with the details of the chuck mechanism for gripping and holding a whole fruit of the orange species, in position to be severed by a slicing knife, which is also automatically operated, and then moving the severed halves of the fruit to the milling part of the device where the juice is extracted from the said halves. After extraction of the juice and pulp from the aforesaid halves, the gripping mechanism is moved back to original position and the parts are operated to expel the empty skins of the fruit and is then moved to position to receive another whole fruit to repeat the operation.

Figure 1:
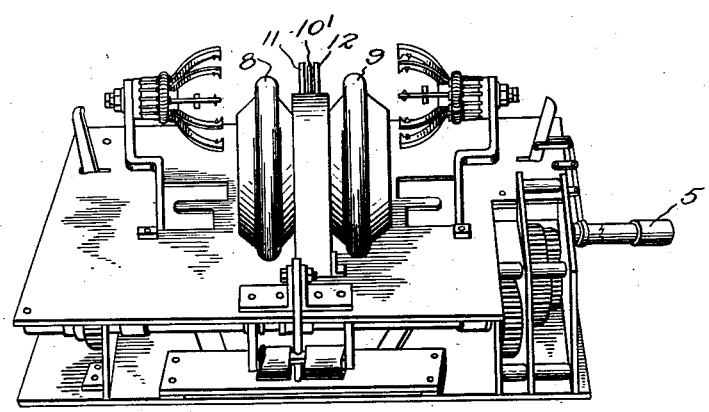
Figure 1 is a perspective of the fruit cutting and milling machine showing the fruit gripping mechanism in position for movement into gripping contact with a fruit.
Figure 2:
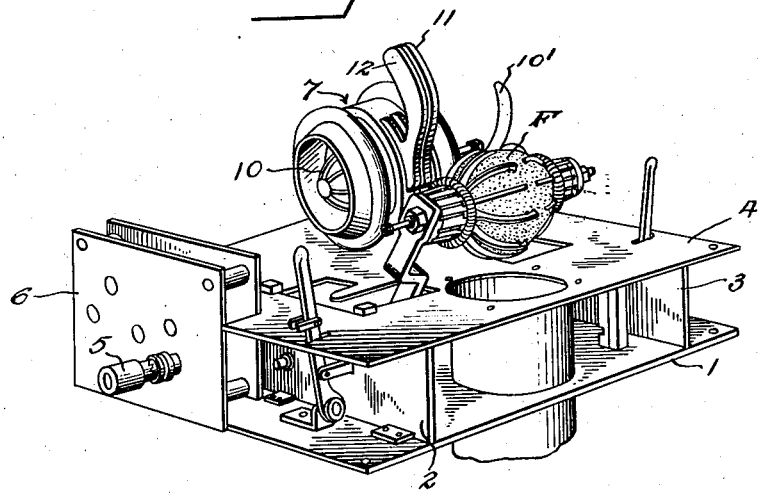
Figure 2 is a perspective of the same machine taken from another point of view and showing the gripping and cutting mechanisms in another operative position.

The present application is limited to the details of construction of the gripping mechanism in combination with the mechanism for slicing the fruit when held in gripping position. The milling device 7 is mounted on the rear of the table 4, as shown in Figure 2, and comprises a pair of conical chambers 8 and 9 within each of which rotates a miller 10 (see Figure 2). This miller is provided with ribs and various other elements for decoring the severed halves of a fruit F gripped by fingers of the type shown in this application.

Immediately forward of the milling device, the machine is provided with a knife 10' nested normally between guard plates 11 and 12 and adapted to be projected in timed relation to the movements of the fruit gripping mechanism so as to sever the fruit while held in the position illustrated clearly in Figure 2 of the drawings. This knife 10' has a slicing movement as well as a pressing movement through the fruit and is operated automatically in proper timed relation with the fruit gripping chucks by the same mechanism. The details of this operating mechanism and of the peculiar mechanism for giving the required slicing movement to the knife are fully disclosed in my said co-pending appplication.

In the drawings, the fruit gripping chucks are shown at the forward end of the machine with their jaws fully opened to permit an orange or similar fruit to be received therebetween. The chucks in this position are widely separated; but when the orange is positioned properly the jaws are moved inwardly to receive the fruit F between them and then by contact of certain parts of the chuck have their jaws moved inwardly into gripping contact with the rind of the fruit to hold the fruit securely while the knife performs its slicing operation. This fruit gripping and slicing position is shown in Figure 2.

Immediately after the severance of the fruit, the knife 10' is snapped back to its position between the guards 11 and 12 as shown in Figure 3 of the drawings. The chucks are moved away from each other to separate the severed halves of the fruit F. From this position, shown in Figure 3, the chucks are moved rearwardly of the machine and on opposite sides of the mill device 7, the chucks are next moved inwardly until the severed halves of the fruit make contact with the knife 10' to have the pulp, juice and seeds extracted therefrom.

At the expiration of this operation, the gripping chucks are again moved outwardly from the milling device and then forwardly toward their initial position where the milled skins are discharged to fall into an opening 13 in the table 4 and into a waste pipe 14. The machine after the expulsion of the milled skins comes to rest with the chucks in the position shown in Figure 1, ready to repeat the operation on another whole fruit, which may be supported in the zone of operation of the chucks, as by the arcuate wire seat 15 having its end suitably secured to the table 4 on opposite sides of the opening 13.

The structural details of the gripping chucks are shown in Figures 7 to 16, inclusive. Each chuck is carried by the upper end of the arm 16 provided with an aperture 17, through which extends a hollow cylindrical support 18, which is screwthreaded externally to receive a nut 19 for securing said support to said arm 16, a washer W being interposed between said arm 16 and nut 19. The support 18 is extended laterally to form a flange 20, which seats against one face of the upper end of the arm 16 and is drawn into close contact therewith by means of the nut 19. A dowel pin 21, extending into the flanged part of the support 18 and through the upper end of the arm 16, prevents rotation of the support in said arm.

A hollow cylindrical member 22 is secured to the support 18 by means of the screws 23, and this member (see Figure 13) is provided with an axial bore 24 alined with the bore 25 in the supporting member 18 to receive an ejector pin 26 which is slidably mounted in the said alined bores 24 and 25. The bore 24 of the cylindrical member 22 is enlarged to form a large countersink 27 in which is slidably mounted a frustoconical sleeve 28 adapted to slide on a reduced part 29 of the ejector pin 26 between a shoulder 30, formed on said pin, and an ejector abutment 31 fixedly secured to the end of said reduced part 29.

The cylindrical member 22 is provided with a plurality of radial slots 32 spaced equi-distantly from each other around said member. These slots 32 extend clear through the member 22 into the enlarged bore or countersink 27. Seated in each of these slots is a chuck member 33 pivoted at one end thereof to a pivot ring 34 (see Figure 14), the flange 20 of the supporting member 18 being provided with a corresponding number of radial slots 35 to permit rotation of the arcuate pivot ends 36 of the chuck members 33 about their pivot ring 34.

The pivot ring 34 is seated in an annular groove 37 formed in the end of the cylindrical member 22, and is held in this groove 37 by contact with the bottom of a correspondingly shaped annular groove 38, formed in the flange 20 of the supporting member 18. Both of said annular grooves are semi-circular in cross section and fit snugly over the pivot ring 34 when the member 18 is properly secured by the screws 23 to the member 22.

As will be apparent from inspection of Figures 13, to 15, the slots 35 correspond in number and location on the supporting member 18 to the number of the slots 32 and location thereof on the member 22. Preferably, the slots should be even in number in order to permit the slots on the flanged part 20 of the member 18 to be machined straight across a diameter of said part 20.

Each of the chuck members 33 has its free ends spread out arcuately to terminate in a grip 39 adapted to sink into the skin or rind of fruit, preferably of the citrus variety, to hold the fruit for cutting and milling operation adapted to be performed by other parts of the machine. The cylindrical member 22 is provided, between its ends, with an annular arcuate groove 40, adapted to form a seat for correspondingly shaped arcuate plates 41, suitably secured to the chuck members between the ends thereof. These arcuate plates 41 prevent the gripping ends of the chuck members 33 from approaching each other too closely to permit the insertion of the fruit between the gripping ends.

The arcuate plates 41 are also shaped to receive an annular coil spring 42 which holds the chuck members 33 normally in their closed position, as shown in Figure 10, with the stop plates 41 seated in the arcuate groove 40. The sleeve 28 is adapted to contact with and slide along the inclined edges 43 of the chuck members 33, whenever the ejector pin 26 is moved from the position shown in Figure 8 to that shown in Figure 10 and vice versa.

At the limit of outward movement of the ejector pin 26 toward the grips 39, the sleeve 28 is seated under a flat portion 44 on the lower edge of each chuck member 33 and holds all of said chuck members with the grips 39 spread apart as a preliminary to the reception of a fruit between said grips 39. The abutment 31 is located so as to contact with the fruit F (see Figure 8) and to be forced inwardly toward arm 16 by contact with said fruit when the arm 16 is swung toward the direction of the fruit. Continued pressure of the fruit on the abutment 31 causes the inner end 45 of said abutment to contact with the sleeve 28 and force the sleeve 28 from under the flat portion 44 of the chuck members 33 to permit the springs 42 to force the chuck plates inwardly toward each other and to embed the grips 39 in the fruit, as shown in Figure 10.

The grips 39 extend transversely across the ends of the chuck members 33 and hold the fruit against movement axially from the cylindrical member 22. In order to prevent rotation of the fruit F in the grips 39, the inner arcuate edges 46 of the chuck members 33 may be provided with any desired number of teeth 47 adapted to embed in the periphery of the fruit and prevent rotation thereof in the chuck. Any desired number of teeth 47 may be formed on the chuck members 33, and may be made of any desired length or omitted altogether, according to the texture of the rind or skin of the fruit being processed.

The ejector pin 26 is screwthreaded at its outer end to receive a nut 48, which forms a stop to limit the movement of the said ejector pin 26 axially in the bores 24 and 25, and a lock nut 49 is threaded onto the end of the said ejector pin to contact with and lock the stop nut 48 in adjusted position on the said ejector pin.

The lower ends of the arms 16 which carry the chucks are fixedly secured to the sleeves 50, slidably but non-rotatably mounted on the shaft 51, forming part of the operating mechanism described and illustrated in my said co-pending application. This mechanism also operates ejector arms 52, which are pivoted at their lower ends on base 1, in proper timed relation to strike the ends of the ejector rods 26 and thereby spread apart the chuck members 33 and push the decored fruit F out of the chucks. So far as the present invention is concerned, these arms 52 are to be considered merely as means for moving the ejector rods in one direction in the chucks and regardless of any particular mechanism for operating them.

As described fully in my co-pending application, the shaft 61 is oscillated in timed relation with the sliding movement of the sleeve 50 on the squared shaft 51 so as to swing the fruit gripping chucks backward and forward across the table 4. The sleeves 50 move at the same rate toward and from the center of the opening 13 either to grip a whole fruit supported by the stand 15, or to expel the decored skins from the chucks when the latter are operated by the action of the ejector rods under the hammer blows of the ejector arms 52. The movement of the opposite chucks toward each other is limited so as to provide a space between the end grips 39 for the admission of the knife 10' to slice the fruit while the latter is gripped and supported by and between the opposite chucks.

In the modified form of the invention, shown in Figures 17 and 18, the chuck members 53 are substantially the same in every respect as the members 33. In order to ensure a more complete gripping of the fruit between the chuck members, each chuck member 53 has a stamping 54 made of sheet material and provided with teeth 55 on its opposite edges adapted to sink into the fruit. In this form of the invention, the arcuate plate 41 is omitted and a plate 56 formed on the end of the stamping 54 is substituted for the plate 41. The stamping 54 has the greater part of its body formed to fit under the arcuate edge 57 of the member 53 and to be suitably welded or otherwise secured to that arcuate edge. The stamping 54 is also provided with a slot 58 intermediate the arcuate portion thereof and the plate part 56 in order to adapt the stamping for ready assembly on the chuck member 53. The construction and method of assembling this stamping 54 on the chucks will be obvious from inspection of Figures 17 and 18.

The structural details of the other parts of this modified chuck mechanism are substantially the same as those of the first described form and are identified in Figures 17 and 18 by the same reference characters.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. In a fruit juice extractor, a fruit gripping chuck comprising a support having a cylindrical bore therethrough, gripping levers equi-angularly spaced apart on said support and pivoted thereto, yielding means surrounding and engaging the edges of said levers for forcing the free ends of said levers toward the axis of said bore, and means slidable in said bore for swinging said levers to move their free ends away from said axis against the tension of said yielding means.

2. In a fruit juice extractor, a fruit gripping chuck comprising a support having a cylindrical bore therethrough, gripping levers equi-angularly spaced apart around said bore and each having one end pivoted to said support, yielding means surrounding and engaging the edges of said levers for forcing the free ends of said levers toward the axis of said bore, and means for swinging said levers against the tension of said yielding means to move the said free ends away from the axis of said bore.

3. In a fruit juice extractor, a fruit gripping chuck comprising a support having a cylindrical bore therethrough, a cylindrical member secured to said support co-axial with the axis of said bore, a pivot ring secured between said support and member concentric with said axis, fruit gripping levers spaced apart around said support and cylindrical member and having one end of each pivoted to said ring, said member being provided with radial slots for slidably receiving said levers, yielding means engaging the outer edges of said levers for forcing the free ends of the levers toward said axis, and means slidable in the bore of said cylindrical member for forcing the free ends of said levers away from said axis against the tension of said yielding means.

4. In a fruit juice extractor, a fruit gripping chuck comprising a cylindrical support, a cylindrical member connected to said support coaxial therewith, said member being provided with radial slots, fruit gripping levers pivoted to said support at the joint between the support and members, a spring surrounding said levers between the ends thereof for swinging them through said slots toward the axis of said member, a rod slidable axially through said support and member, and means slidably mounted on said rod for forcing the free ends of the levers away from said axis against the tension of said spring.

5. In a fruit juice extractor, a fruit gripping chuck comprising a support having a cylindrical bore therethrough, a cylindrical member secured to said support co-axial with the axis of said bore, a pivot ring secured between said support and member concentric with said axis, fruit gripping levers spaced apart around said support and cylindrical member and having one end of each pivoted to said ring, said member being provided with radial slots for slidably receiving said levers, yielding means engaging the outer edges of said levers for forcing the free ends of the levers toward said axis, and means slidable in the bore of said cylindrical member for forcing the free ends of said levers away from said axis against the tension of said yielding means.

6. In a fruit juice extractor, a fruit gripping chuck comprising a cylindrical support, a cylindrical member connected to said support coaxial therewith, said member being provided with radial slots, fruit gripping levers pivoted to said support at the joint between the support and members, a spring surrounding said levers between the ends thereof for swinging them through said slots toward the axis of said member, a rod slidable axially through said support and member, and means slidably mounted on said rod for forcing the free ends of the levers away from said axis against the tension of said spring.

GUY C. GUM.